United States Patent
Sonobe et al.

(10) Patent No.: US 11,953,610 B2
(45) Date of Patent: Apr. 9, 2024

(54) DEVICE AND METHOD FOR CALCULATING MOVEMENT INFORMATION

(71) Applicant: Furuno Electric Co., Ltd., Nishinomiya (JP)

(72) Inventors: Tatsuya Sonobe, Nishinomiya (JP); Hiraku Nakamura, Nishinomiya (JP); Hiroyuki Toda, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 197 days.

(21) Appl. No.: 17/410,923

(22) Filed: Aug. 24, 2021

(65) Prior Publication Data

US 2021/0382186 A1    Dec. 9, 2021

Related U.S. Application Data (63) Continuation of application No. PCT/JP2020/001819, filed on Jan. 21, 2020.

(30) Foreign Application Priority Data

Feb. 25, 2019  (JP) ................... 2019-031574

(51) Int. Cl.
  *G01S 19/52*  (2010.01)
  *G01S 19/35*  (2010.01)
  *G01S 19/47*  (2010.01)

(52) U.S. Cl.
  CPC .............. *G01S 19/52* (2013.01); *G01S 19/35* (2013.01); *G01S 19/47* (2013.01)

(58) Field of Classification Search
  CPC .................................. G01S 19/52; G01S 19/47
  (Continued)

(56) References Cited

U.S. PATENT DOCUMENTS 5,657,025 A    8/1997 Ebner et al.
7,027,918 B2 *  4/2006 Zimmerman ........... G01S 19/54
                                                   701/470
(Continued)

FOREIGN PATENT DOCUMENTS

JP    H04122816 A    4/1992
JP    H09178508 A    7/1997
(Continued)

OTHER PUBLICATIONS

English Translation of Written Opinion for the Related PCT application (Year: 2021).*

(Continued)

*Primary Examiner* — Bo Fan
(74) *Attorney, Agent, or Firm* — Alleman Hall & Tuttle LLP (57) ABSTRACT

Movement information is calculated with high accuracy, without being influenced by the number of GNSS signals receivable by each of a plurality of antennas. A movement information calculating device includes a plurality of antennas, a clock generator, a plurality of GNSS receivers, and an arithmetic logical unit. The plurality of antennas, each receives a GNSS signal. The clock generator generates a clock signal. The plurality of GNSS receivers are connected to the respective antennas, and share the clock signal from the clock generator and calculate GNSS observed values by using the shared clock signal and the GNSS signals, respectively. The arithmetic logical unit calculates movement information including a speed of a movable body based on the GNSS observed values from the plurality of GNSS receivers.

6 Claims, 5 Drawing Sheets

(58) Field of Classification Search
USPC .......................... 342/357.3, 357.26, 357.34
See application file for complete search history.

(56) References Cited

U.S. PATENT DOCUMENTS

| | | | |
|---|---|---|---|
| 7,136,751 B2 * | 11/2006 | Pinto | G01S 19/26 |
| | | | 701/472 |
| 7,292,186 B2 * | 11/2007 | Miller | G01S 19/54 |
| | | | 375/355 |
| 8,138,970 B2 * | 3/2012 | Whitehead | G01S 19/53 |
| | | | 342/357.34 |
| 8,346,466 B2 * | 1/2013 | Chueh | G01C 21/1656 |
| | | | 701/472 |
| 2003/0149512 A1 * | 8/2003 | Hrovat | G01S 19/53 |
| | | | 701/1 |
| 2005/0004748 A1 | 1/2005 | Pinto et al. | |
| 2006/0232467 A1 | 10/2006 | Small | |
| 2015/0094952 A1 | 4/2015 | Moeglein et al. | |
| 2015/0219767 A1 * | 8/2015 | Humphreys | G01S 19/485 |
| | | | 342/357.26 |

FOREIGN PATENT DOCUMENTS

| | | |
|---|---|---|
| JP | 2006522920 A | 10/2006 |
| JP | 2007271500 A | 10/2007 |
| JP | 2016540187 A | 12/2016 |
| WO | WO-2017137987 A1 * | 8/2017 |

OTHER PUBLICATIONS

ISA Japan Patent Office, International Search Report Issued in Application No. PCT/JP2020/001819, dated Mar. 31, 2020, WIPO, 6 pages.

Ben Afia, A. et al., "A Low-cost GNSS/IMU/Visual monoSLAM/WSS Integration Based on Kalman Filtering for Navigation in Urban Environments," Proceedings of the 28th International Technical Meeting of the Satellite Division of The Institute of Navigation, Sep. 18, 2015, pp. 618-628, p. 620, right column, line 1 to p. 624, left column, line 7, fig. 2.

ISA Japan Patent Office, Written Opinion of the International Searching Authority Issued in Application No. PCT/JP2020/001819, dated Mar. 31, 2020, WIPO, 3 pages.

* cited by examiner

DEVICE AND METHOD FOR CALCULATING MOVEMENT INFORMATION

CROSS-REFERENCE TO RELATED APPLICATION(S)

This application is a continuation of PCT International Application No. PCT/JP2020/001819, which was filed on Jan. 21, 2020, and which claims priority to Japanese Patent Application Ser. No. 2019-031574 filed on Feb. 25, 2019, the entire disclosures of each of which are herein incorporated by reference for all purposes.

TECHNICAL FIELD

The present disclosure relates to a movement information calculating device and a method of calculating movement information which receive GNSS signals by a plurality of antennas and calculate the movement information, such as a speed.

BACKGROUND

Patent Document 1 (JP2007-271500A) discloses a position and posture estimating device. The position and posture estimating device of Patent Document 1 is provided with a plurality of antennas mounted on a movable body. The position and posture estimating device of Patent Document 1 performs positioning by using GNSS signals received by the plurality of antennas.

However, according to the configuration disclosed in Patent Document 1, the estimation accuracy varies according to the number of GNSS signals receivable by each of the plurality of antennas. That is, if there is an antenna with fewer receivable GNSS signals, the estimation accuracy falls due to this effect.

Therefore, one purpose of the present disclosure is to provide a movement information calculating device capable of calculating movement information with high accuracy, without being influenced by the number of GNSS signals receivable by each of a plurality of antennas.

SUMMARY

A movement information calculating device according to the present disclosure includes a plurality of antennas, a clock generator, a plurality of GNSS receivers, and an arithmetic logical unit. The plurality of antennas, each receives a GNSS signal. The clock generator generates a clock signal. The plurality of GNSS receivers are connected to the respective antennas. The plurality of GNSS receivers calculate GNSS observed values by using the GNSS signals and the clock signal. The arithmetic logical unit calculates movement information including a speed of a movable body based on the GNSS observed values from the plurality of GNSS receivers.

According to this configuration, the plurality of GNSS receivers use the same clock signal. That is, the clock signal is a common clock signal for the plurality of GNSS receivers. Thus, even when the combination or the number of positioning satellites which are transmission sources of the GNSS signals received by the plurality of GNSS receivers (the plurality of antennas) differ from each other, the arithmetic logic unit can calculate the movement information by using all the GNSS signals received by the plurality of GNSS receivers.

According to the present disclosure, movement information can be calculated with high accuracy, without being influenced by the number of GNSS signals receivable by each of a plurality of antennas.

DETAILED DESCRIPTION

First Embodiment

Figure 1:
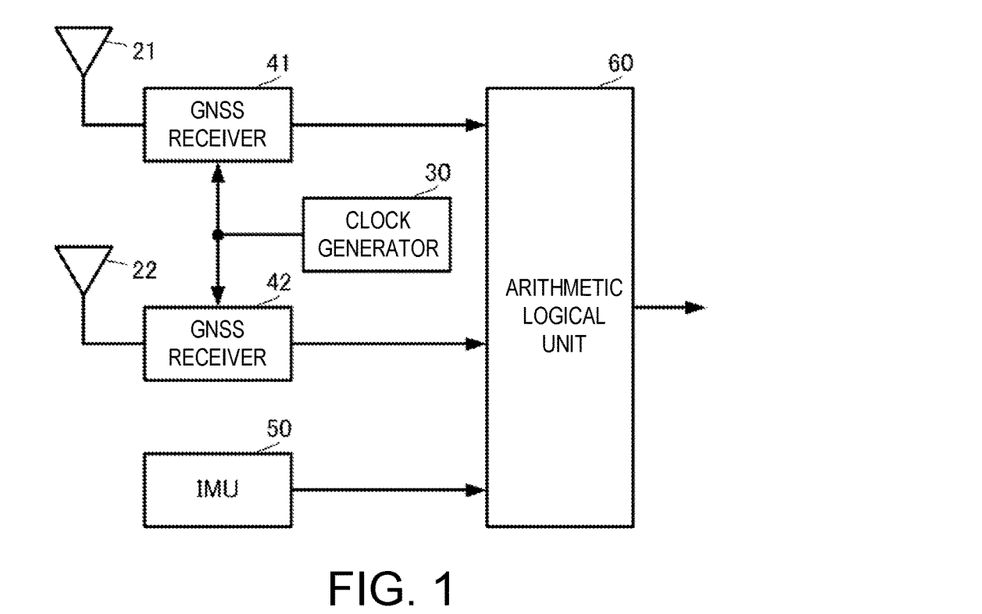
FIG. 1 is a block diagram illustrating a configuration of a movement information calculating device according to a first embodiment.

A movement information calculating device and a method of calculating movement information according to a first embodiment is described with reference to the drawings. FIG. 1 is a block diagram illustrating a configuration of the movement information calculating device according to the first embodiment.

As illustrated in FIG. 1, the movement information calculating device 10 may include an antenna 21, an antenna 22, a clock generator 30, a GNSS receiver 41, a GNSS receiver 42, an IMU 50, and an arithmetic logical unit 60. "A plurality of antennas" of the present disclosure may be comprised of the antenna 21 and the antenna 22. "A plurality of GNSS receivers" of the present disclosure may be comprised of the GNSS receiver 41 and the GNSS receiver 42.

GNSS is an abbreviation of Global Navigation Satellite System, and it includes the GPS (Global Positioning System).

The antenna 21 and the antenna 22 may be installed in a movable body 90 (see FIG. 3) which is an object for a calculation of the movement information, such as a speed. The movable body 90 is a ship, for example. The antenna 21 and the antenna 22 may be disposed in an open-sky environment. The installed position of the antenna 21 may differ from the installed position of the antenna 22. The antenna 21 may be connected to the GNSS receiver 41, and the antenna 22 may be connected to the GNSS receiver 42.

The antenna 21 may receive GNSS signals from positioning satellites, and output them to the GNSS receiver 41. The antenna 22 may receive GNSS signals from positioning satellites, and output them to the GNSS receiver 42. The positioning satellites which are transmission sources of the GNSS signals received by the antenna 22 may be the same as or may differ from the positioning satellites which are transmission sources of the GNSS signals received the antenna 21.

The clock generator 30, the GNSS receiver 41, and the GNSS receiver 42 may be implemented by a given electronic circuit.

The clock generator 30 may generate a clock signal, and output it to the GNSS receiver 41 and the GNSS receiver 42. The clock signal may be a signal used as a reference of processing of the GNSS receiver 41 and processing of the GNSS receiver 42.

The GNSS receiver 41 may be provided with a DLL circuit for a code phase, and a PLL circuit for a carrier phase. The GNSS receiver 41 may acquire and track the GNSS signals received by the antenna 21 by using the DLL circuit and the PLL circuit. The GNSS receiver 41 may calculate a GNSS observed value based on the tracking result. Here, the GNSS receiver 41 may use the clock signal to perform a timing control of the DLL circuit and the PLL circuit and a calculation of the GNSS observed value on the basis of the clock signal. The GNSS observed value may include a code phase and a carrier phase for every positioning signal. The GNSS receiver 41 may output the GNSS observed value to the arithmetic logical unit 60.

The GNSS receiver 42 may be provided with a DLL circuit for the code phase, and a PLL circuit for the carrier phase. The GNSS receiver 42 may acquire and track the GNSS signal received by the antenna 22 by using the DLL circuit and the PLL circuit. The GNSS receiver 42 may calculate the GNSS observed value based on the tracking result. Here, the GNSS receiver 42 may use the clock signal to perform a timing control of the DLL circuit and the PLL circuit, and a calculation of the GNSS observed value on the basis of the clock signal. The GNSS observed value may include a code phase and a carrier phase for every positioning signal. The GNSS receiver 42 may output the GNSS observed value to the arithmetic logical unit 60.

In this way, according to the movement information calculating device 10, the GNSS observed value calculated by the GNSS receiver 41 and the GNSS observed value calculated by the GNSS receiver 42 may be based on the same clock signal (common (shared) clock signal).

The IMU 50 may be an inertia sensor provided with a 3-axis acceleration sensor and an angular velocity sensor, for example. The IMU 50 may be installed in the movable body. The IMU 50 may measure an acceleration or an angular velocity, and output the measurement value (sensor output value) to the arithmetic logical unit 60. Here, the IMU 50 may measure and output the measurement value at a given interval.

Figure 2:
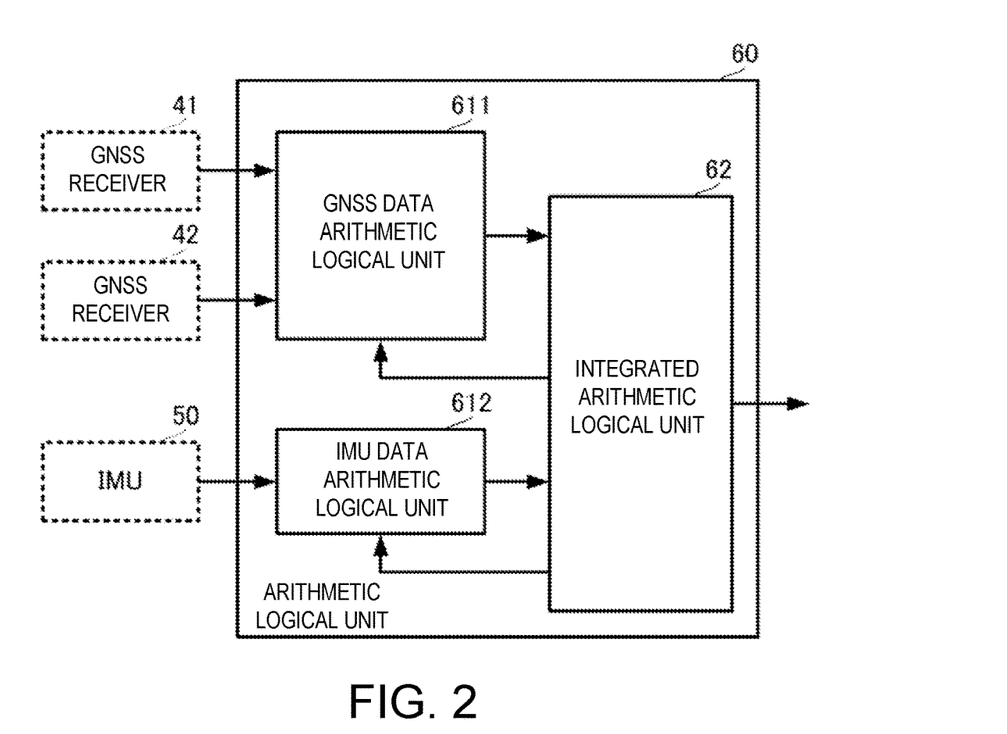
FIG. 2 is a functional block diagram of an arithmetic logical unit according to the first embodiment.

FIG. 2 is a functional block diagram of the arithmetic logical unit according to the first embodiment. The arithmetic logical unit 60 may include a GNSS data arithmetic logical unit 611, an IMU data arithmetic logical unit 612, and an integrated arithmetic logical unit 62. The arithmetic logical unit 60 may be implemented, for example, by a program of processing of each of the GNSS data arithmetic logical unit 611, the IMU data arithmetic logical unit 612, and the integrated arithmetic logical unit 62, and an arithmetic unit, such as a CPU, which executes the program.

The GNSS observed value from the GNSS receiver 41 and the GNSS observed value from the GNSS receiver 42 may be inputted into the GNSS data arithmetic logical unit 611. The GNSS data arithmetic logical unit 611 may use the code phase of each GNSS operation value to calculate a pseudo range, and a line-of-sight direction vector which connects each antenna and each positioning satellite. Upon the calculation of the pseudo range, time based on the clock signal described above may be used as well.

The GNSS data arithmetic logical unit 611 may estimate a GNSS speed based on an integrated value of the carrier phase of each GNSS operation value, along with the calculation data. Here, the GNSS data arithmetic logical unit 611 may estimate the GNSS speed based on a clock drift error estimated by the integrated arithmetic logical unit 62. The GNSS data arithmetic logical unit 611 may output the estimated GNSS speed to the integrated arithmetic logical unit 62.

The measurement value from the IMU 50 may be inputted into the IMU data arithmetic logical unit 612. The IMU data arithmetic logical unit 612 may calculate an IMU acceleration and an IMU angular velocity based on the measurement value. Here, the IMU data arithmetic logical unit 612 may calculate the IMU acceleration and the IMU angular velocity based on an acceleration bias and an angular-velocity bias which are estimated by the integrated arithmetic logical unit 62.

The IMU data arithmetic logical unit 612 may calculate an IMU speed based on the integrated value of the IMU acceleration and the IMU angular velocity. The IMU data arithmetic logical unit 612 may output the calculated IMU speed to the integrated arithmetic logical unit 62.

The integrated arithmetic logical unit 62 may be implemented by an extended Kalman-filter EKF, for example. The integrated arithmetic logical unit 62 may set an observation vector of the extended Kalman filter including the GNSS speed and the IMU speed. Moreover, the integrated arithmetic logical unit 62 may set a state vector of the extended Kalman filter including the integrated speed which is outputted as the movement information calculating device 10, the clock drift error of the clock signal, and the acceleration bias error of the IMU 50.

The integrated arithmetic logical unit 62 may estimate the integrated speed and various kinds of errors by implementing the extended Kalman filter having the observation vector and the state vector. The integrated arithmetic logical unit 62 may feed back, to the GNSS data arithmetic logical unit 611, the estimated error related to the GNSS observed value including the clock drift error included in the state vector. The GNSS data arithmetic logical unit 611 may estimate the GNSS speed etc. based on the fed-back estimated error. The integrated arithmetic logical unit 62 may feed back, to the IMU data arithmetic logical unit 612, the estimated error related to an IMU observed value (measurement value), such as the acceleration bias error and the angular-velocity bias error, included in the state vector. The IMU data arithmetic logical unit 612 may calculate the IMU speed etc. based on the fed-back estimated error.

In such a configuration, the clock signal may be common to the plurality of GNSS receivers (in this embodiment, the GNSS receiver 41 and the GNSS receiver 42). Thus, the arithmetic logical unit can estimate the clock drift error based on all the observed values acquired by the plurality of GNSS receivers, without estimating the clock drift error for every GNSS receiver. Therefore, the number of different GNSS signals which are used for the estimation of the clock drift error may increase.

For this reason, the clock drift error may be estimated with high accuracy. Therefore, the speed estimated based on the clock drift error may be highly precise.

Figure 3:
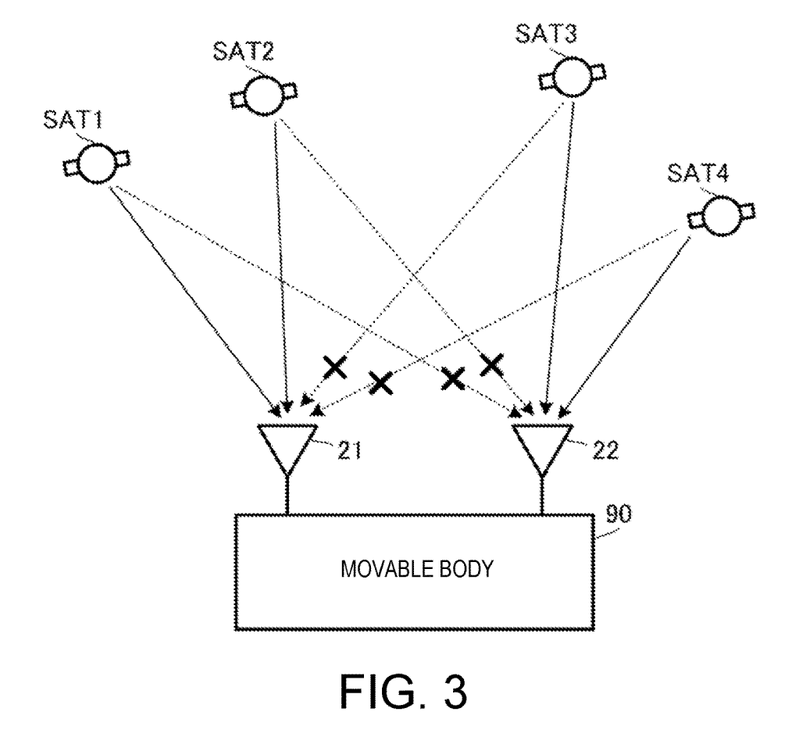
FIG. 3 is a view illustrating a concept of an estimation accuracy of the movement information of the present disclosure.

FIG. 3 is a view illustrating a concept of the estimation accuracy of the movement information of the present disclosure. In the case of FIG. 3, the antenna 21 can receive the GNSS signal of a positioning satellite SAT1 and the GNSS signal of a positioning satellite SAT2, but cannot receive the GNSS signal of a positioning satellite SAT3 and the GNSS signal of a positioning satellite SAT4. The antenna 22 can receive the GNSS signal of the positioning satellite SAT3 and the GNSS signal of the positioning satellite SAT4, but cannot receive the GNSS signal of the positioning satellite SAT1 and the GNSS signal of the positioning satellite SAT2. This is caused when the receiving condition of the GNSS signal changes according to the position of the movable body 90, for example. In more detail, such a state may be caused by a case where the reception of the GNSS signal by the antenna is blocked by a gantry crane etc. when the movable body 90 is a ship and the movable body 90 reaches a shore.

Here, suppose that the clock signal of the GNSS receiver 41 connected to the antenna 21 differs from the clock signal of the GNSS receiver 42 connected to the antenna 22. In this case, the arithmetic logical unit 60 may estimate the clock drift error of the clock signal of the GNSS receiver 41 based on the GNSS observed value of the GNSS signal of the positioning satellite SAT1 and the GNSS signal of the positioning satellite SAT2. Moreover, the arithmetic logical unit 60 may estimate the clock drift error of the clock signal of the GNSS receiver 42 based on the GNSS observed value of the GNSS signal of the positioning satellite SAT3 and the GNSS signal of the positioning satellite SAT4.

In this way, when the clock signal is made individual for every GNSS receiver, the clock drift error of each clock signal is estimated based on the GNSS observed value of the two GNSS signals. Therefore, the estimation accuracy of the clock drift error becomes for the two GNSS signals.

On the other hand, according to the present disclosure, the clock signal may be common to the GNSS receiver 41 and the GNSS receiver 42. In this case, the clock drift error may be estimated based on the GNSS observed value of four GNSS signals which is a combination of the two GNSS signals received by the GNSS receiver 41 and the two GNSS signals received by the GNSS receiver 42. Thus, in the present disclosure, the estimation accuracy of the clock drift error may become for the four GNSS signals.

Therefore, the estimation accuracy of the clock drift error may improve by using the configuration and the processing of the present disclosure. In addition, the estimation accuracy of the integrated speed included in the same state vector may improve by the improvement in the estimation of the clock drift error. Moreover, the estimation accuracies of the position or the attitude angle may also improve by the improvement in the estimation accuracy of the integrated speed.

Therefore, the movement state including the speed can be estimated and calculated with high accuracy, without being influenced by the receiving condition of the GNSS signals of the plurality of antennas.

Moreover, in this configuration and processing, the number of clock drift errors included in the state vector may be one. Thus, the unknown factor which constitutes the state vector of the extended Kalman filter decreases compared with the case where the clock drift error may be estimated for every GNSS receiver. Therefore, the processing load of the arithmetic logical unit 60 can be reduced. Therefore, the estimated speed may improve together with the estimation accuracy of the movement state, for example.

(Description of Method of Calculating Movement State)

The above configuration may be implemented by dividing the various processings for calculating the movement state into a plurality of functional parts. However, each of the processings may be performed by a processing unit, such as a CPU, after being programmed. In this case, the program may be stored in a memory, and the processing unit may read and execute the program stored in the memory. Note that the concrete description of each processing is as described above, and therefore, it is omitted.

Figure 4:
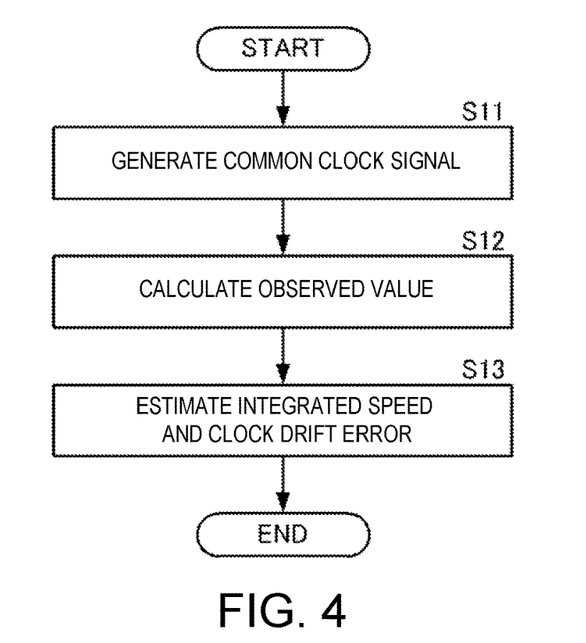
FIG. 4 is a flowchart illustrating one example of a method of calculating the movement information.

FIG. 4 is a flowchart illustrating one example of the method of calculating the movement information. The processing unit may generate the common clock signal (S11). The processing unit may calculate the GNSS observed value based on the received GNSS signal by using the common clock signal (S12). Moreover, the processing unit may acquire the IMU observed value which is the measurement value of the IMU.

The processing unit may estimate the integrated speed based on the various kinds of observed values which are calculated or acquired (S13). Here, the processing unit may estimate the clock drift error together with the integrated speed, and use them for the correction at the time of preprocessing of the estimation of the integrated speed.

Second Embodiment

Figure 5:
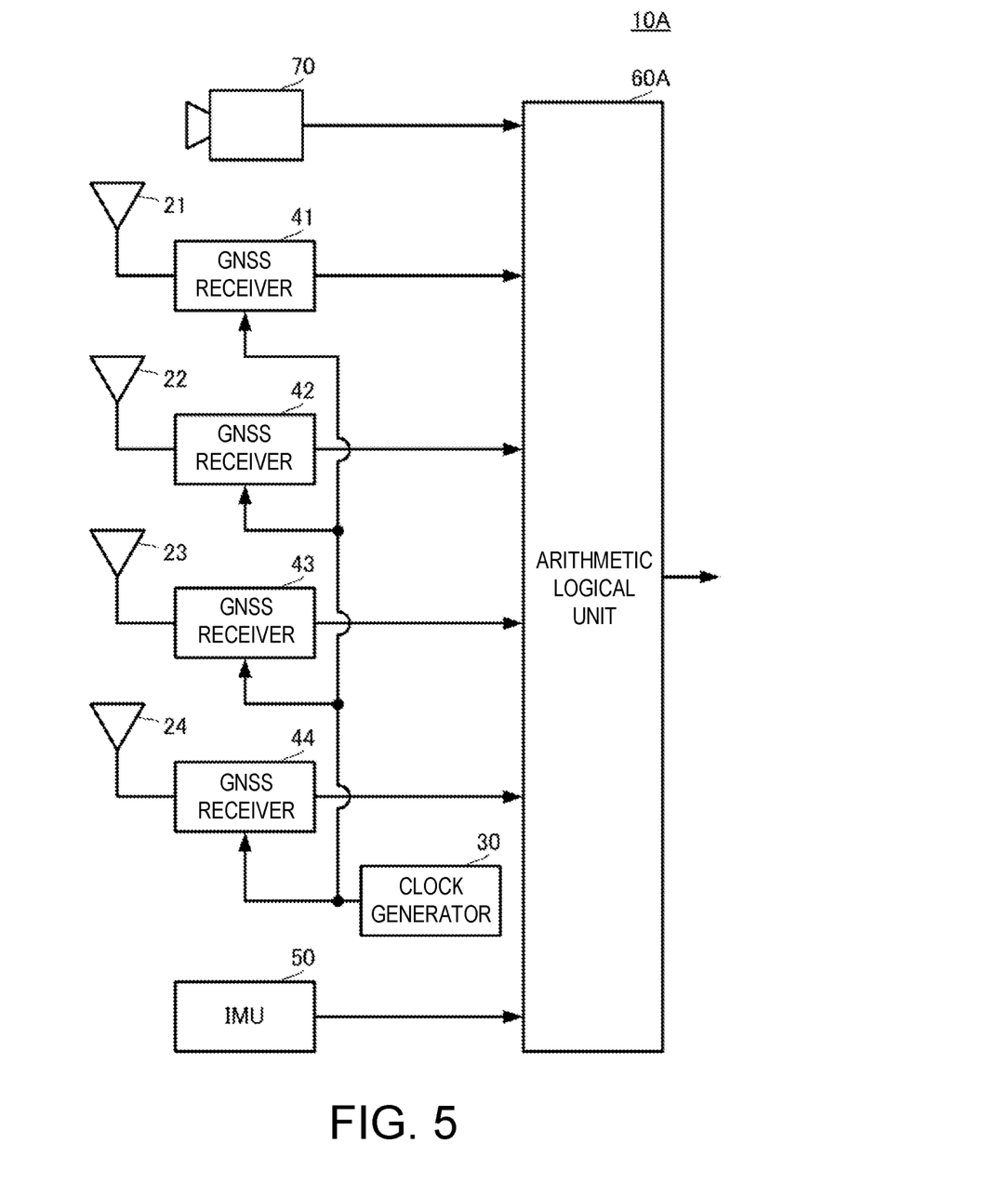
FIG. 5 is a block diagram illustrating a configuration of a movement information calculating device according to a second embodiment.

A movement information calculating device according to a second embodiment is described with reference to the drawings. FIG. 5 is a block diagram illustrating a configuration of the movement information calculating device according to the second embodiment.

As illustrated in FIG. 5, the movement information calculating device 10A according to the second embodiment differs from the movement information calculating device 10 according to the first embodiment in that the numbers of antennas and GNSS receivers are changed and a camera 70 is added, and in that processing of an arithmetic logical unit 60A according to the modification and the addition is changed. Other configurations and processings of the movement information calculating device 10A are the same as those of the movement information calculating device 10, and therefore, description of similar parts is omitted.

As illustrated in FIG. 5, the movement information calculating device 10A may include the antenna 21, the antenna 22, an antenna 23, an antenna 24, the clock generator 30, the GNSS receiver 41, the GNSS receiver 42, a GNSS receiver 43, a GNSS receiver 44, the IMU 50, the arithmetic logical unit 60A, and the camera 70.

The installed position of the antenna 21, the installed position of the antenna 22, the installed position of the antenna 23, and the installed position of the antenna 24 may differ from each other. Here, the antenna 21, the antenna 22, the antenna 23, and the antenna 24 may be installed so that all the antennas are not lined up linearly at the same time. The antenna 21 may be connected to the GNSS receiver 41, and the antenna 22 may be connected to the GNSS receiver 42. The antenna 23 may be connected to the GNSS receiver 43, and the antenna 24 may be connected to the GNSS receiver 44.

The clock generator 30 may generate a clock signal, and output it to the GNSS receiver 41, the GNSS receiver 42, the GNSS receiver 43, and the GNSS receiver 44.

The GNSS receiver 41 may calculate a GNSS observed value based on the GNSS signal received by the antenna 21, and output it to the arithmetic logical unit 60A. The GNSS receiver 42 may calculate a GNSS observed value based on the GNSS signal received by the antenna 22, and output it to the arithmetic logical unit 60A. The GNSS receiver 43 may calculate a GNSS observed value based on the GNSS signal received by the antenna 23, and output it to the arithmetic logical unit 60A. The GNSS receiver 44 may calculate a GNSS observed value based on the GNSS signal received by the antenna 24, and output it to the arithmetic logical unit 60A.

The IMU 50 may output the measurement value to the arithmetic logical unit 60A.

The camera 70 may acquire the behavior of the movable body 90 and the surrounding situation as a video image. The camera 70 may output the video to the arithmetic logical unit 60A.

Figure 6:
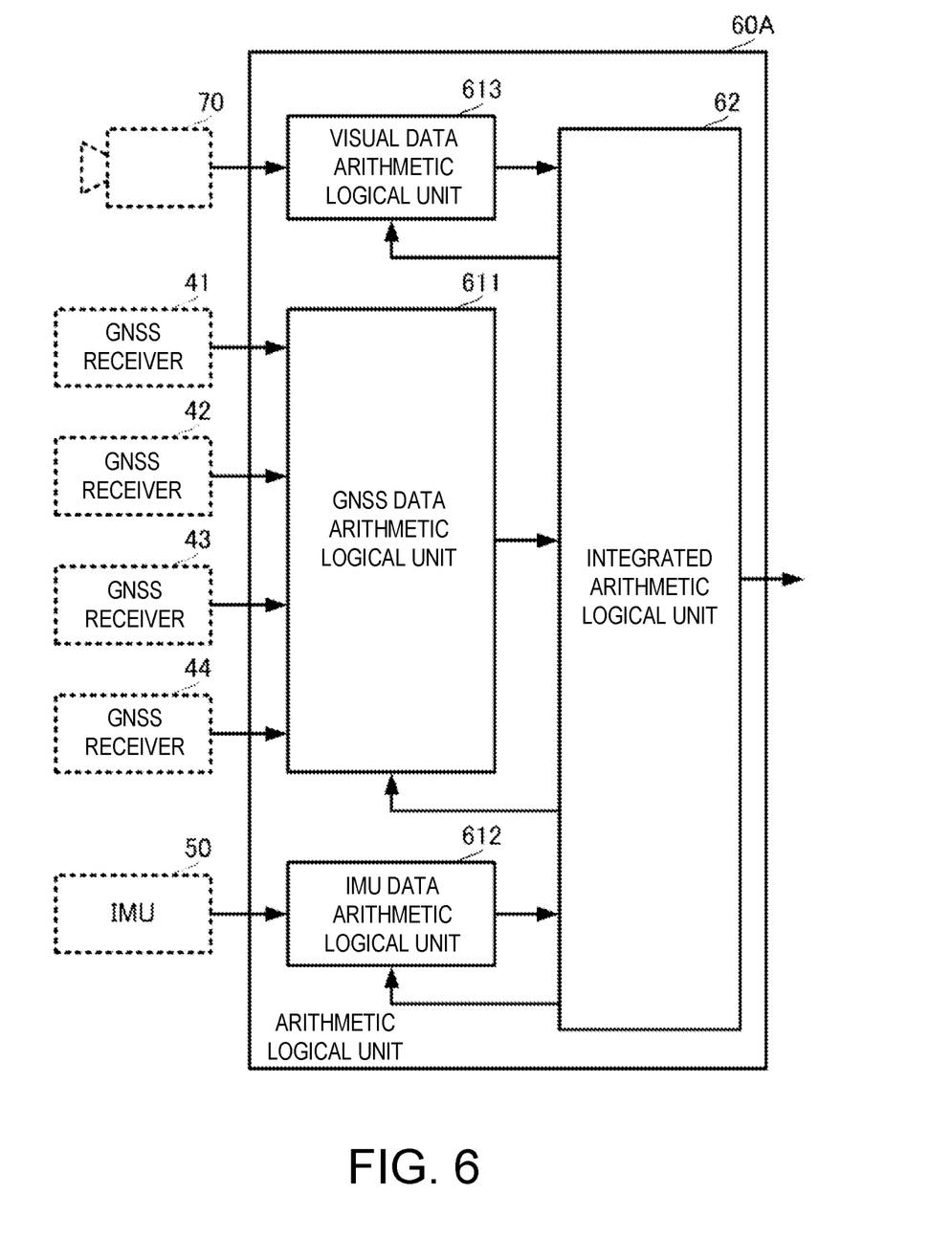
FIG. 6 is a functional block diagram of an arithmetic logical unit according to the second embodiment.

FIG. 6 is a functional block diagram of the arithmetic logical unit according to the second embodiment. The arithmetic logical unit 60A may include a GNSS data arithmetic logical unit 611, an IMU data arithmetic logical unit 612, a visual data arithmetic logical unit 613, and an integrated arithmetic logical unit 62.

The GNSS data arithmetic logical unit 611 may estimate a GNSS speed and a GNSS attitude angle based on the GNSS observed value from the GNSS receiver 41, the GNSS observed value from the GNSS receiver 42, the GNSS observed value from the GNSS receiver 43, and the GNSS observed value from the GNSS receiver 44, and output them to the integrated arithmetic logical unit 62.

The IMU data arithmetic logical unit 612 may calculate an IMU speed and an IMU attitude angle based on the measurement value from the IMU 50, and output them to the integrated arithmetic logical unit 62.

The visual data arithmetic logical unit 613 may set a reference point, while extracting a plurality of characteristic points from the video. The visual data arithmetic logical unit 613 may generate spatial information including the positions of a plurality of characteristic points with respect to the position of the reference point, a moving amount, and a scale, and output it to the integrated arithmetic logical unit 62. The scale may be expressed by a ratio of a distance between the characteristic point obtained from the video and the reference point and a distance between the characteristic point obtained from the GNSS speed and the reference point.

The integrated arithmetic logical unit 62 may set an observation vector of the extended Kalman filter including the GNSS speed and the GNSS attitude angle from the GNSS data arithmetic logical unit 611, the IMU speed and the IMU attitude angle from the IMU data arithmetic logical unit 612, and the spatial information from the visual data arithmetic logical unit 613. The integrated arithmetic logical unit 62 may set a state vector of the extended Kalman filter including the integrated speed outputted as the movement information calculating device 10A, a clock drift error of the clock signal, an acceleration bias error of the IMU 50, an angular-velocity bias error, and a scale error of the spatial information.

The integrated arithmetic logical unit 62 may estimate the integrated speed and various kinds of errors by performing the extended Kalman filter having the observation vector and the state vector. Moreover, the integrated arithmetic logical unit 62 may correct the spatial information based on the scale error.

According to this configuration, the movement information calculating device 10A can calculate the speed of the movable body 90 with high accuracy, and can give the highly-precise distance and position for visual information. Further, in this case, since the clock drift error is estimated based on all the GNSS signals received by the four antennas, the clock drift error may be estimated with high accuracy. Therefore, the speed of the movable body 90 can be calculated with high accuracy, and the distance and the position which are given to the visual information may also become highly precise.

Moreover, even if the number of GNSS receivers is four, the number of clock drift errors to be estimated may be one. Therefore, the estimation may become high speed and highly precise.

Particularly, in this way, when estimating of the speed etc. by integrating the visual information, the observed value by the GNSS signal, and the observed value of the IMU, the processing load of the integrated arithmetic logical unit 62 may become very high. Therefore, by reducing the clock drift error to be estimated, the processing load of the integrated arithmetic logical unit 62 may be reduced, and the various kinds of processings, such as a formation of the visual information can be further increased in the speed, while estimating the speed with high accuracy.

Third Embodiment

Figure 7:
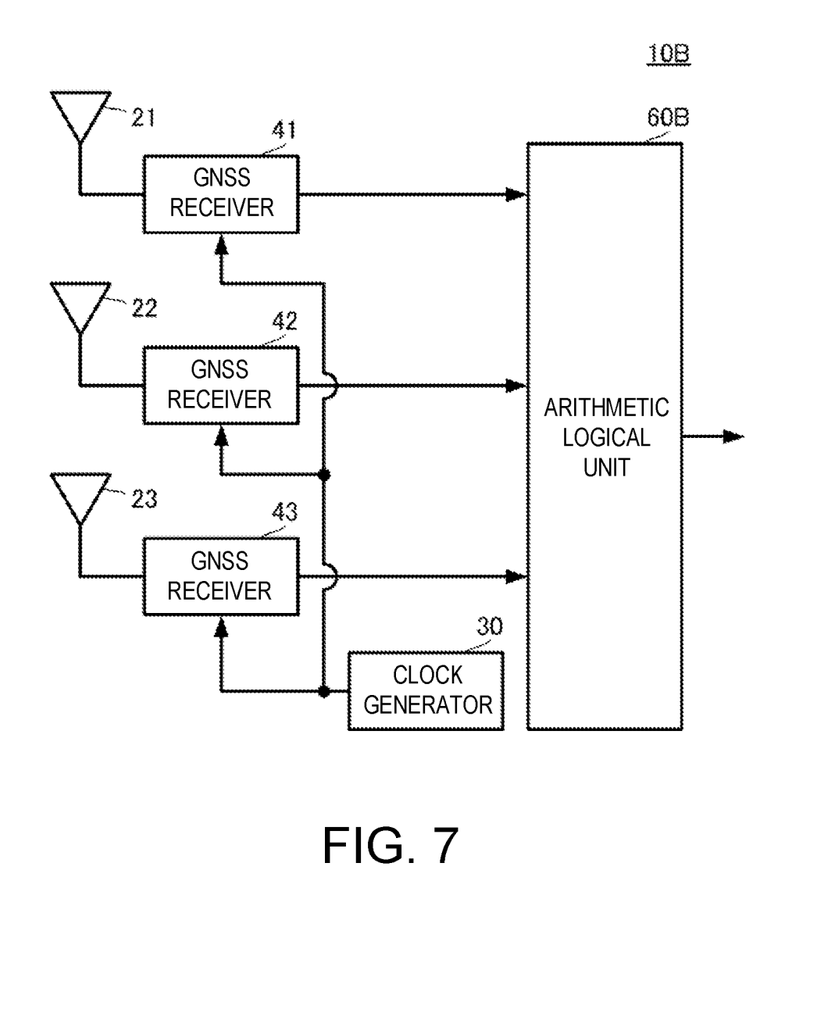
FIG. 7 is a block diagram illustrating a configuration of a movement information calculating device according to a third embodiment.

A movement information calculating device according to a third embodiment is described with reference to the drawings. FIG. 7 is a block diagram illustrating a configuration of the movement information calculating device according to the third embodiment.

As illustrated in FIG. 7, the movement information calculating device 10B according to the third embodiment differs from the movement information calculating device 10 according to the first embodiment in that the numbers of antennas and GNSS receivers are changed, and the IMU 50 is omitted, and in that processing of an arithmetic logical unit 60B is changed according to the modification and the addition. Other configurations and processings of the movement information calculating device 10B are similar to those of the movement information calculating device 10, and therefore, description of similar parts is omitted.

As illustrated in FIG. 7, the movement information calculating device 10B may include the antenna 21, the antenna 22, the antenna 23, the clock generator 30, the GNSS receiver 41, the GNSS receiver 42, the GNSS receiver 43, and the arithmetic logical unit 60B.

The installed position of the antenna 21, the installed position of the antenna 22, and the installed position of the antenna 23 may differ from each other. Here, the antenna 21, the antenna 22, and the antenna 23 may be installed so that all the antennas are not lined up linearly at the same time. The antenna 21 may be connected to the GNSS receiver 41, and the antenna 22 may be connected to the GNSS receiver 42. The antenna 23 may be connected to the GNSS receiver 43.

The clock generator 30 may generate a clock signal, and output it to the GNSS receiver 41, the GNSS receiver 42, and the GNSS receiver 43.

The GNSS receiver 41 may calculate a GNSS observed value based on the GNSS signal received by the antenna 21, and output it to the arithmetic logical unit 60B. The GNSS receiver 42 may calculate a GNSS observed value based on the GNSS signal received by the antenna 22, and output it to the arithmetic logical unit 60B. The GNSS receiver 43 may calculate a GNSS observed value based on the GNSS signal received by the antenna 23, and output it to the arithmetic logical unit 60B.

In the arithmetic logical unit 60B, a GNSS observed value from the GNSS receiver 41, a GNSS observed value from the GNSS receiver 42, and a GNSS observed value from the GNSS receiver 43 may be inputted into the GNSS data arithmetic logical unit 611.

The arithmetic logical unit 60B may be implemented by an extended Kalman-filter EKF, for example. The arithmetic logical unit 60B may set an observation vector of the extended Kalman filter including a GNSS speed. Moreover, the arithmetic logical unit 60B may set a state vector of the extended Kalman filter including the integrated speed outputted as the movement information calculating device 10B, and a clock drift error of the clock signal.

Thus, in this way, even when the IMU 50 is not used, the movement information calculating device 10B can estimate the integrated speed with high accuracy, similar to the movement information calculating device 10.

Note that the configuration of each of the above embodiments can suitably be combined, and operation and effects according to the combination can be acquired.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom,"

"top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A movement information calculating device, comprising:
   a plurality of antennas, each configured to receive a GNSS signal;
   a clock generator configured to generate a clock signal;
   a plurality of GNSS receivers connected to the respective antennas, and configured to share the clock signal from the clock generator and calculate GNSS observed values by using the shared clock signal and the GNSS signals, respectively; and
   an arithmetic logical unit configured to calculate movement information including a speed of a movable body based on the GNSS observed values from the plurality of GNSS receivers, wherein
   the arithmetic logical unit estimates an error including a clock drift of the clock signal,
   the arithmetic logical unit calculates the speed of the movable body based on the estimated error, and
   when the combination of the plurality of GNSS signals received by each of the plurality of antennas is different, the arithmetic logic unit is configured to calculate the speed of the movable body by using all of the GNSS signals transmitted from positioning satellites and received by the plurality of GNSS receivers.

2. The movement information calculating device of claim 1, comprising an inertia sensor configured to measure an acceleration or an angular velocity,
   wherein the arithmetic logical unit calculates the movement information further based on a sensor output value outputted from the inertia sensor.

3. The movement information calculating device of claim 2, comprising a camera configured to acquire a video,
   wherein the arithmetic logical unit calculates visual information including a position or a moving amount of the movable body based on the video, and corrects the visual information based on the movement information.

4. A method of calculating movement information, comprising the steps of:
   receiving GNSS signals via a plurality of antennas;
   generating a clock signal common to a plurality of GNSS receivers;
   calculating GNSS observed values in the plurality of GNSS receivers by using the GNSS signals received by the plurality of antennas and the common clock signal, respectively;
   calculating the movement information including a speed of a movable body based on the GNSS observed values from the plurality of GNSS receivers;
   estimating an error including a clock drift of the clock signal; and
   calculating the speed of the movable body based on the estimated error, wherein
   when the combination of the plurality of GNSS signals received by each of the plurality of antennas is different, the speed of the movable body is configured to be calculated by using all of the GNSS signals transmitted from positioning satellites and received by the plurality of GNSS receivers.

5. The method of claim 4, comprising the steps of:
   acquiring a sensor output value including an acceleration or an angular velocity; and
   calculating the movement information further based on the sensor output value.

6. The method of claim 5, comprising the steps of:
   acquiring a video;
   calculating visual information including a position or a moving amount of the movable body based on the video; and
   correcting the visual information based on the movement information.

* * * * *